US008027115B2

(12) United States Patent
Fujita et al.

(10) Patent No.: US 8,027,115 B2
(45) Date of Patent: Sep. 27, 2011

(54) DATA RECORDING APPARATUS FOR RECORDING A DATA SIGNAL ONTO A MAGNETIC RECORDING MEDIUM AND DATA RECORDING SYSTEM USING THE DATA RECORDING APPARATUS

(75) Inventors: Masao Fujita, Osaka (JP); Kenji Tanaka, Osaka (JP); Sadamu Kuse, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 250 days.

(21) Appl. No.: 12/213,055

(22) Filed: Jun. 13, 2008

(65) Prior Publication Data

US 2008/0310044 A1    Dec. 18, 2008

(30) Foreign Application Priority Data

Jun. 15, 2007  (JP) ................................. 2007-158737

(51) Int. Cl.
*G11B 5/02* (2006.01)
*G11B 5/09* (2006.01)
*H04N 5/77* (2006.01)

(52) U.S. Cl. ............. 360/55; 360/48; 386/223; 386/224
(58) Field of Classification Search .......................... None
See application file for complete search history.

(56) References Cited

U.S. PATENT DOCUMENTS

| 6,421,080 | B1 * | 7/2002 | Lambert ....................... 348/143 |
| 6,956,477 | B2 * | 10/2005 | Chun ............................ 340/541 |
| 7,146,052 | B2 * | 12/2006 | Sugimura et al. ............. 382/232 |
| 7,171,106 | B2 * | 1/2007 | Elberbaum ..................... 386/46 |
| 7,319,720 | B2 * | 1/2008 | Abrams, Jr. ............. 375/240.12 |
| 2002/0003573 | A1 * | 1/2002 | Yamaguchi et al. .......... 348/218 |
| 2003/0156649 | A1 * | 8/2003 | Abrams, Jr. ............. 375/240.24 |
| 2004/0247282 | A1 * | 12/2004 | Nishi et al. ..................... 386/46 |
| 2008/0151415 | A1 * | 6/2008 | Biskeborn et al. ......... 360/77.12 |
| 2008/0198487 | A1 * | 8/2008 | Lala Balaji et al. ............... 360/3 |
| 2009/0196462 | A1 * | 8/2009 | Sharoni et al. ................ 382/103 |

FOREIGN PATENT DOCUMENTS

| JP | 11-275522 A | 10/1999 |
| JP | 2003-339042 A | 11/2003 |

* cited by examiner

*Primary Examiner* — Daniell L Negron
*Assistant Examiner* — Regina N Holder
(74) *Attorney, Agent, or Firm* — Birch, Stewart, Kolasch & Birch, LLP

(57) ABSTRACT

A data recording apparatus and a data recording system of the present invention includes buffer memories 2*a* to 2*c* that accumulate data in a plurality of channels transferred from an external appliance on a channel basis, a data selector 3 that reads the data accumulated in the buffer memories 2*a* to 2*c*, and a data drive 4 that records the data read by the data selector 3 onto a magnetic tape, wherein the data selector 3 selectively reads the data accumulated in the buffer memories 2*a* to 2*c*, and outputs the data in an order of recording onto a magnetic tape in the tape drive 4. According to such a configuration, a data recording apparatus that can be realized at low cost and a recording system using the data recording apparatus can be provided.

4 Claims, 4 Drawing Sheets

DATA RECORDING APPARATUS FOR RECORDING A DATA SIGNAL ONTO A MAGNETIC RECORDING MEDIUM AND DATA RECORDING SYSTEM USING THE DATA RECORDING APPARATUS

BACKGROUND OF THE INVENTION

1. Field of the Invention

The present invention relates to a data recording apparatus capable of recording a data signal onto a magnetic recording medium such as a magnetic tape. The present invention also relates to a data recording system using the data recording apparatus.

2. Description of Related Art

A multi-channel recording system such as a recent security camera system includes a plurality of cameras, controllers for controlling the operations of the cameras, and monitors capable of displaying images photographed by the cameras. The images photographed by the cameras are recorded in a hard disk. The number of cameras that can be connected to such a system is determined by a data transfer speed. For example, in the case of a system using a hard disk, the data transfer speed is at most about 14 Mbps, and the number of cameras that can be connected to one system is at most 16 (16 channels).

Patent Document 1 (JP 2003-339042 A) discloses a configuration of recording image data captured by cameras in a hard disk drive. According to the configuration described in Patent Document 1, captured image data is recorded in a hard disk drive, and thereafter, saved in a tape library. That is, the tape library is used for the purpose of backup.

The above-mentioned configuration of recording image data in a hard disk drive has a problem of an increase in cost. More specifically, according to the above configuration, the number of cameras that can be connected to a system is limited to 16, so that a system needs to be added in order to increase the number of cameras, which increases cost substantially.

Furthermore, in the case where the remaining capacity of a hard disk drive is used up, it is necessary to add a hard disk drive. One hard disk drive costs about ¥1,000,000, which is more expensive compared with a tape medium that costs about several tens of thousands yen per volume. Thus, cost increases largely every time a hard disk drive is added.

SUMMARY OF THE INVENTION

Therefore, with the foregoing in mind, it is an object of the present invention to provide a data recording apparatus that can be realized at low cost and a data recording system using the data recording apparatus.

A data recording apparatus of the present invention includes: an accumulating portion that accumulates image data, in which address data is added to main data in a plurality of channels, transferred from an external appliance on a channel basis; a selecting portion that reads the image data accumulated in the accumulating portion; and a recording portion that records the image data read by the selecting portion onto a magnetic tape, wherein the selecting portion selectively reads the image data accumulated in the accumulating portion, and outputs the image data in a predetermined order of recording onto the magnetic tape in the recording portion.

A data recording system of the present invention includes: a plurality of external appliances capable of outputting main data; and a data recording apparatus capable of obtaining the main data output from the external appliances, wherein the data recording apparatus includes: an accumulating portion that accumulates image data, in which address data is added to the main data in a plurality of channels, transferred from the external appliances on a channel basis; a selecting portion that reads the image data accumulated in the accumulating portion; and a recording portion that records the image data read by the selecting portion onto a magnetic tape, wherein the selecting portion selectively reads the image data accumulated in the accumulating portion, and outputs the image data in a predetermined order of recording onto the magnetic tape in the recording portion.

According to the present invention, data in a plurality of channels is recorded onto a magnetic tape with a higher data transfer speed, compared with a hard disk drive, so that the number of channels in the data recording apparatus can be increased. Thus, it is unnecessary to add a system unlike a conventional example in the case of increasing the number of external appliances connected to the data recording apparatus, resulting in a decrease in cost.

Furthermore, the unit price per volume of a magnetic tape is more inexpensive than that of a hard disk drive, so that the recordable capacity in the data recording apparatus can be increased at low cost.

BRIEF DESCRIPTION OF THE DRAWINGS

FIG. 2A is a schematic diagram showing a structure of data dealt with by a data selector.

FIG. 2B is a schematic diagram showing a structure of data dealt with by the data selector.

FIG. 2C is a schematic diagram showing a structure of data dealt with by the data selector.

FIG. 2D is a schematic diagram showing a structure of data dealt with by the data selector.

DETAILED DESCRIPTION OF THE INVENTION

Embodiment

A data recording apparatus and a data recording system of the present embodiment have a main feature of using a magnetic tape as a recording medium for storing data, instead of a hard disk drive as in a conventional example. At present, a hard disk drive has a maximum capacity of 750 Gbytes, whereas a magnetic tape for recording data under the Linear Tape Open (LTO) specification, having a storage capacity of 1.6 Tbytes per volume, has been commercialized owing to the advancement of a high-density recording technique. Furthermore, the data transfer speed (average value) of a hard disk drive is 14 Mbps, whereas the data transfer speed (average value) of a tape drive under the LTO specification currently is at least 20 Mbps, and hence, the development of a technique of increasing a speed is advancing further. Thus, a magnetic tape is more advantageous compared with a hard disk drive in a recording capacity and a data transfer speed. The present embodiment realizes a data recording apparatus and a data recording system capable of recording various kinds of data such as multi-channel image data onto such a magnetic tape.

Hereinafter, a data recording system among the data recording apparatus and the data recording system will be described.

Figure 1:
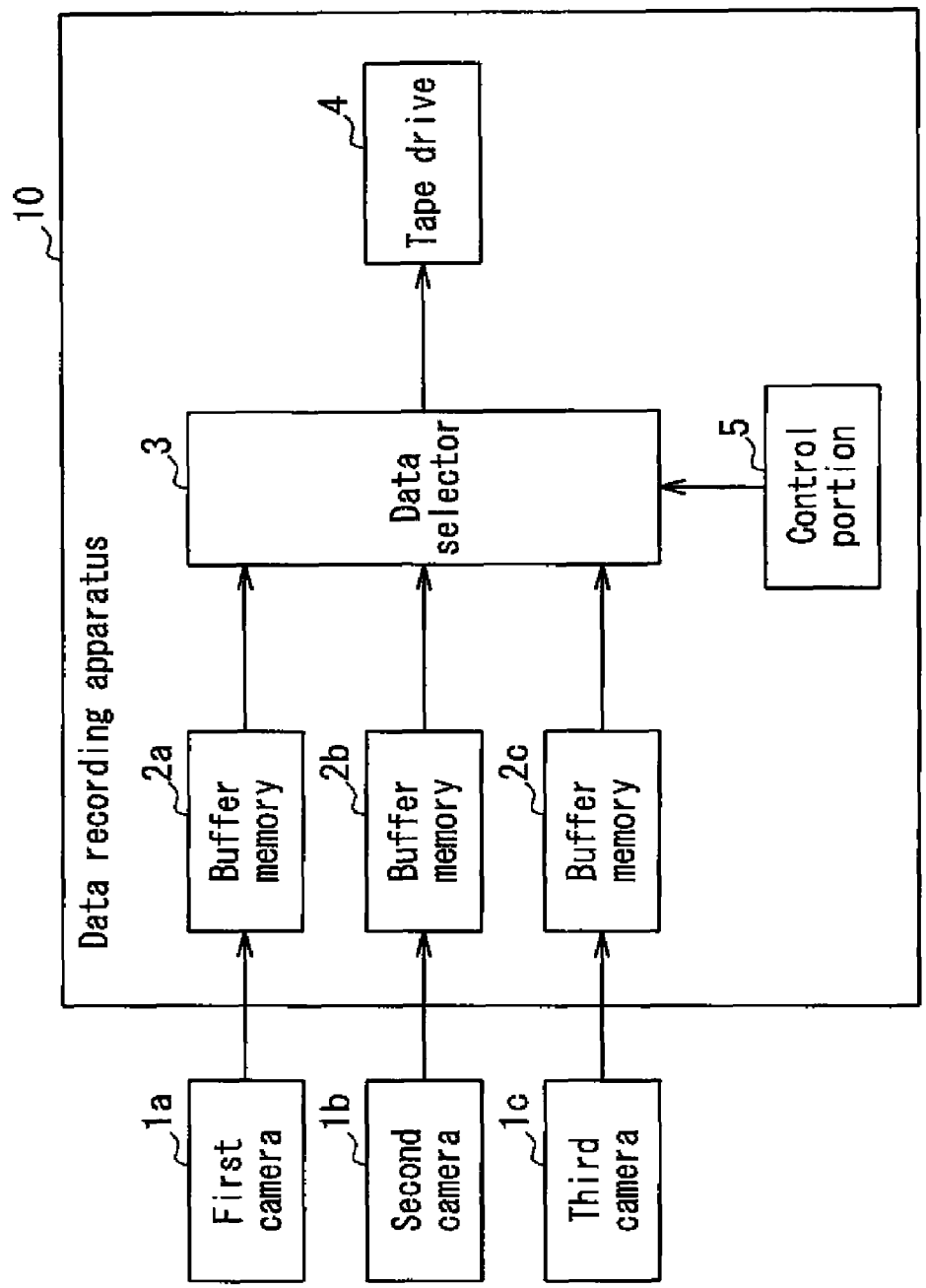
FIG. 1 is a block diagram showing a configuration of a security camera system that is an example of a data recording apparatus or a data recording system of an embodiment.

FIG. 1 shows a configuration of a data recording system of the present embodiment. In the present embodiment, a security camera system for controlling the operations of a plurality of cameras and recording image data captured by the cameras onto a recording medium will be described as an example of the data recording system.

In FIG. 1, a data recording apparatus 10 includes buffer memories 2a to 2c, a data selector 3, a tape drive 4, and a control portion 5.

A first camera 1a, a second camera 1b, and a third camera 1c can be connected to the data recording apparatus 10, and respectively convert optical images incident from outside into electric images to output them. Specifically, each of the cameras 1a to 1c has an imaging element, an image processing portion, an analog/digital converting portion (A/D converter), an image compressing portion, and the like. The imaging element is composed of a charge coupled device (CCD) image sensor, a complementary metal-oxide semiconductor (CMOS) image sensor, or the like. The image processing portion can subject an image signal, which is converted photoelectrically by the imaging element, to noise removal and the like. The A/D converter can convert the image signal output from the image processing means into digital data (mage data). The image compressing portion can compress the image data output from the A/D converter by a predetermined encoding procedure. Thus, digitized image data is output from each of the cameras 1a to 1c. In the cameras 1a to 1c, the A/D converter, the image processing portion, and the image compressing portion are not indispensable components, as long as at least image data can be output. Furthermore, the image data output from the cameras 1a to 1c is not limited to digital data, and may be analog signals. In this case, an analog signal is converted into digital data in the data recording apparatus 10. Furthermore, in the present embodiment, although three cameras are connected to the data recording apparatus 10, four or more cameras may be connected thereto. Furthermore, the number of channels (the number of connectable appliances) of the data recording apparatus 10 can be set to be an arbitrary value, depending upon the data transfer speed with respect to the tape drive 4 (described later), and the frame rate and resolution of image data output from each camera. Thus, 16 or more channels in a conventional configuration can be set, and about 100 channels can be set according to a current technique. Needless to say, if the data transfer speed is enhanced to decrease the frame rate and the resolution of image data, the further increase in number of channels can be realized. The cameras 1a to 1c are exemplified merely as external appliances, and any other appliances can be used as long as at least data can be output.

The buffer memories 2a to 2c accumulate image data output from the cameras 1a to 1c temporarily. In the present embodiment, although a plurality of buffer memories 2a to 2c are provided so as to correspond to the cameras 1a to 1c, it is not necessarily required to match the number of the buffer memories with the number of the cameras. For example, one buffer memory may be connected to a plurality of cameras. In this case, data management may be performed on a channel basis in one buffer memory. Furthermore, the buffer memories 2a to 2c are exemplified merely as accumulating portions, and may be any means capable of accumulating at least data transferred from external appliances (the cameras 1a to 1c in the present embodiment) temporarily.

The data selector 3 selectively reads the image data accumulated in the buffer memories 2a to 2c at a predetermined timing (for example, every one second), and outputs the image data to the tape drive 4 in a predetermined order. The data selector 3 is an example of a selecting portion.

The tape drive 4 records the image data output from the data selector 3 onto a recording tape. Specifically, the tape drive 4 includes a magnetic head that records data onto a magnetic tape, a tape driving mechanism that allows a magnetic tape to travel at a predetermined speed. In the present embodiment, the tape drive 4 is loaded with a magnetic tape under the LTO specification, and is capable of recording data onto the magnetic tape. The tape drive 4 is an example of a recording portion.

The control portion 5 controls an operation of the data selector 3. Specifically, the control portion 5 outputs a timing signal for the data selector 3 to select either one of the buffer memories 2a to 2c successively.

Hereinafter, an operation will be described.

When a security camera system in the present embodiment enters a photographing mode, the first camera 1a, the second camera 1b, and the third camera 1c respectively start photographing moving images, and image data (moving image) is output from each of the cameras 1a to 1c. The image data output from the cameras 1a to 1c is accumulated in the buffer memories 2a to 2c.

Next, the data selector 3 successively selects and reads the image data accumulated in the buffer memories 2a to 2c, based on the timing signal output from the control portion 5. The read image data is output to the tape drive 4.

Then, the tape drive 4 records the image data output from the data selector 3 onto a magnetic tape. The structure of the image data output from the data selector 3 will be described later with reference to FIG. 2, and the recording operation with respect to the magnetic tape will be described later with reference to FIG. 4.

FIGS. 2A to 2D are schematic diagrams illustrating an operation in the data selector 3. FIGS. 2A, 2B, and 2C respectively illustrate the image data accumulated in the buffer memories 2a to 2c. FIG. 2D illustrates the image data output from the data selector 3. In FIGS. 2A to 2D, reference numerals a1, a2, . . . denote the image data output from the first camera 1a, which is actually continuous image data (moving image) and shown on the basis of a unit (predetermined time) with which the image data is read selectively by the data selector 3 for convenience of description. Reference numerals b1, b2, . . . similarly denote the image data output from the second camera 1b. Reference numerals c1, c2, . . . similarly denote the image data output from the third camera 1c.

First, the image data shown in FIGS. 2A, 2B, and 2C is accumulated successively in each of the buffer memories 2a to 2c. The data selector 3 successively selects the buffer memory 2a, the buffer memory 2b, . . . on a predetermined time basis (for example, one second) and reads the image data therefrom. Specifically, the data selector 3 reads the image data a1 (FIG. 2A) accumulated in the buffer memory 2a for the first one second, reads the image data b1 (FIG. 2B) accumulated in the buffer memory 2b for the subsequent one second, and reads the image data c1 (FIG. 2C) accumulated in the buffer memory 2c for the subsequent one second. Consequently, the data selector 3 reads the image data in the order of a1, b1, c1, a2, b2, c2, a3, . . . , as shown in FIG. 2D.

Figure 3:
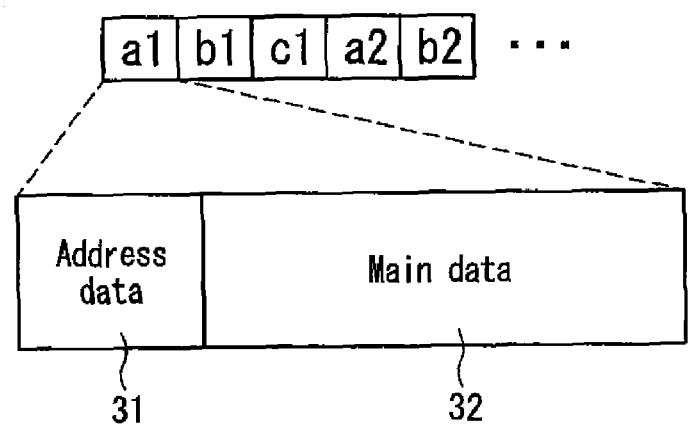
FIG. 3 is a schematic diagram showing a data structure.

FIG. 3 shows an example of the data structure of the image data. As shown in FIG. 3, one image data (for example, the image data a1) is composed of address data 31 and main data 32. The main data 32 contains the image data al on a moving image photographed and generated by the first camera 1a. The address data 31 contains information for specifying the order of the image data. Furthermore, the address data 31 is data based on which the image data is recorded onto a magnetic tape in a predetermined order. The order of the image data shown in FIG. 2D can be managed based on the information contained in the address data.

Figure 4:
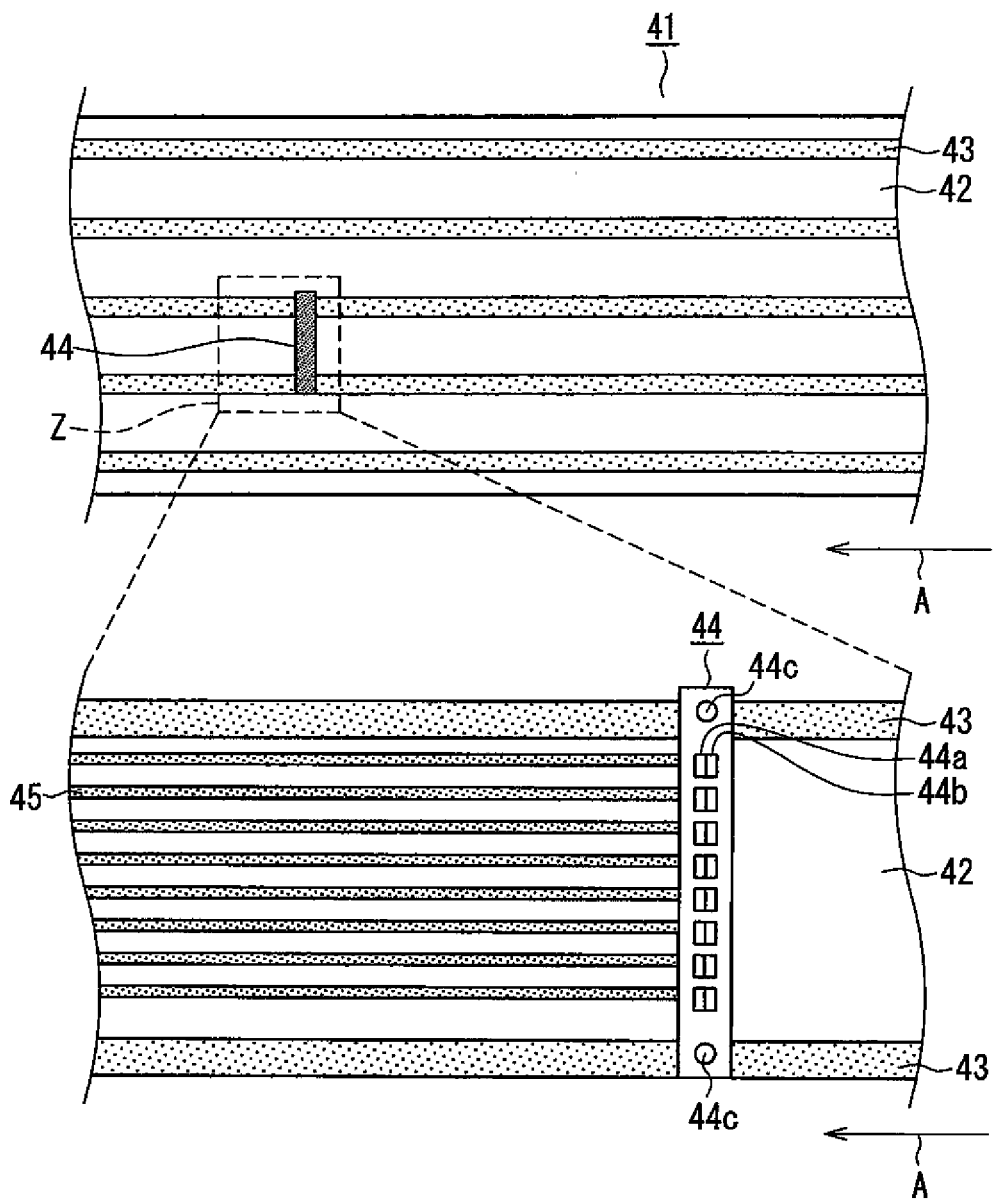
FIG. 4 is a schematic diagram showing a recorded state on a magnetic tape.

FIG. 4 is a schematic diagram illustrating a data recording operation by the tape drive 4 onto a magnetic tape, and shows the positional relationship between a magnetic tape 41 and a magnetic head 44. The magnetic tape 41 shown in FIG. 4 complies with the LTO specification and is contained in a cartridge (not shown). The magnetic tape 41 has a configuration in which a magnetic layer is formed on the surface of a base film with an underlying layer interposed therebetween, and a backcoat layer is formed on the back surface of the base film. Furthermore, the magnetic tape 41 has four data bands 42 and five servo bands 43 in the longitudinal direction thereof. The data bands 42 and the servo bands 43 are placed alternately in the width direction of the magnetic tape 41. The data bands 42 are regions which are formed on the magnetic layer of the magnetic tape 41 and on which data (image data in the present embodiment) can be recorded. The servo bands 43 are regions where a servo signal for performing tracking servo of the magnetic head with respect to the magnetic tape is recorded previously.

As shown in an enlarged view of a Z portion in FIG. 4, the magnetic head 44 has a width with which the magnetic head 44 is capable of scanning one data band 42 and two servo bands 43 simultaneously. The magnetic head 44 includes 8 groups of a first head 44a and a second head 44b capable of recording or reproducing data arranged in the width direction of the magnetic tape 41, and two servo heads 44c capable of reproducing a servo signal recorded in the servo bands 43. The configuration, in which 8 groups of the first head 44a and the second head 44b are arranged, complies with the LTO1 specification, and is merely an example. When the magnetic tape 41 travels in a direction indicated by an arrow A, the first heads 44a are placed in a state capable of recording data in the data band 42, and the second heads 44b are placed in a state capable of reproducing data recorded in the data band 42. Furthermore, when the magnetic tape 41 travels in a direction opposite to the direction indicated by the arrow A, the second heads 44b are placed in a state capable of recording data, and the first heads 44a are placed in a state capable of reproducing data. The numbers of the first heads 44a, the second heads 44b, and the servo heads 44c are examples.

Next, the operation of recording data onto the magnetic tape 41 will be described. As shown in FIG. 4, when data is recorded onto the magnetic tape 41, the magnetic tape 41 is allowed to travel in the direction indicated by the arrow A and the first heads 44a are supplied with a current whereby 8 data tracks 45 can be formed simultaneously in one data band 42.

When data is recorded from the leading end to the trailing end of one data band 42, the magnetic head 44 shifts the position in the width direction of the magnetic tape 41, and supplies a current to the second heads 44b. Next, the magnetic tape 41 is allowed to travel in the direction opposite to the direction indicated by the arrow A, whereby data can be recorded from the trailing end to the leading end of the data band 42 by the second heads 44b. More specifically, data is recorded while the magnetic tape 41 is allowed to reciprocate in the longitudinal direction. Such a reciprocation is repeated several times, whereby data can be recorded in one data band 42 at a high density. At this time, since the magnetic head 44 is shifted slightly in the tape width direction, data can be recorded so as not to overwrite data (track) that has already been recorded. After the magnetic tape 41 is allowed to reciprocate a predetermined number of times to record data in one data band 42, data can be recorded in another data band 42 by performing the same control as that described above.

According to the present embodiment, images photographed by the cameras 1a to 1c are recorded onto a magnetic tape for recording data, whereby a security camera system can be realized at low cost with cost per volume of a recording medium suppressed. More specifically, one hard disk drive (750 Gbytes at maximum) which has been used for recording data conventionally costs about ¥1,000,000, whereas one magnetic tape (1.6 Tbytes at maximum) for recording data costs about ¥20,000. Thus, the cost per volume of a recording medium can be suppressed.

Furthermore, the tape drive for recording data has a data transfer speed higher than that of a hard disk drive, so that recording in real time can be performed. More specifically, the data transfer speed of a hard disk drive is 14 Mbps due to the problem of an interface and the like, whereas the data transfer speed of the tape drive for recording data is 20 Mbps at minimum. Thus, the tape drive has a high data transfer speed, so that recording in real time can be performed, instead of intermittent recording as in a security camera system using a hard disk drive.

Furthermore, the tape drive for recording data has a data transfer speed higher than that of the hard disk drive, so that the frame rate and the resolution of image data can be enhanced. Thus, image data of high quality can be recorded.

Furthermore, at present, a security camera system has a low data transfer speed, so that the number of cameras that can be connected to one hard disk recorder is at most 16 (16 channels). However, according to the configuration using a magnetic tape as in the present embodiment, since a data transfer speed is high, 17 or more (17 channels or more) security cameras are connected to one tape drive, whereby multi-channel recording also can be performed.

Furthermore, when the recording capacity is increased as the entire system, it is necessary to increase the number of hard disk drives in a system using a hard disk drive, which increases cost The present embodiment uses a magnetic tape that is much more inexpensive than the hard disk drive, so that cost can be reduced substantially. In the system of the present embodiment, it is necessary to prepare a tape drive for constructing a system, and the tape drive costs about ¥500,000. Thus, the cost of the system of the present embodiment including the cost of the tape drive is lower than that of the system using a hard disk drive.

Furthermore, in the present embodiment, a plurality of magnetic tapes (cartridges) can be dealt with in one tape drive, so that it becomes easy to manage the magnetic tapes.

In the present embodiment, although image data is recorded onto a magnetic tape, the present embodiment can be applied to a configuration of recording various data in place of image data. Examples of the recordable data include voice data and text data.

Furthermore, in the present embodiment, although data output from external appliances such as the cameras 1a to 1c is digital data, an analog signal may be output. In that case, an analog signal is converted into digital data in the data recording apparatus 10, whereby the configuration of the present invention can be realized.

Furthermore, in the present embodiment, although the 8-channel magnetic head 44 (LTO1 specification) is used as shown in FIG. 4, the amount of data that can be recorded onto a magnetic tape can be increased further by the increase in number of channels of the magnetic head 44. For example, a 16-channel magnetic head is used under the LTO3 specification and the LTO4 specification. Therefore, in the case of the same tape speed, data can be recorded in an amount about twice that of the magnetic head under the LTO1 specification.

Furthermore, in the present embodiment, although a security camera system has been illustrated as an example, the present embodiment also can be applied to another system as long as at least a plurality of data can be input and recorded onto a magnetic tape. Furthermore, the appliance that can be connected to the data recording apparatus 10 is not limited to a camera as in the present embodiment, and an appliance that is at least capable of transferring data to the data recording apparatus 10 can be used. As an application example, there is a multi-tuner system.

Figure 5:
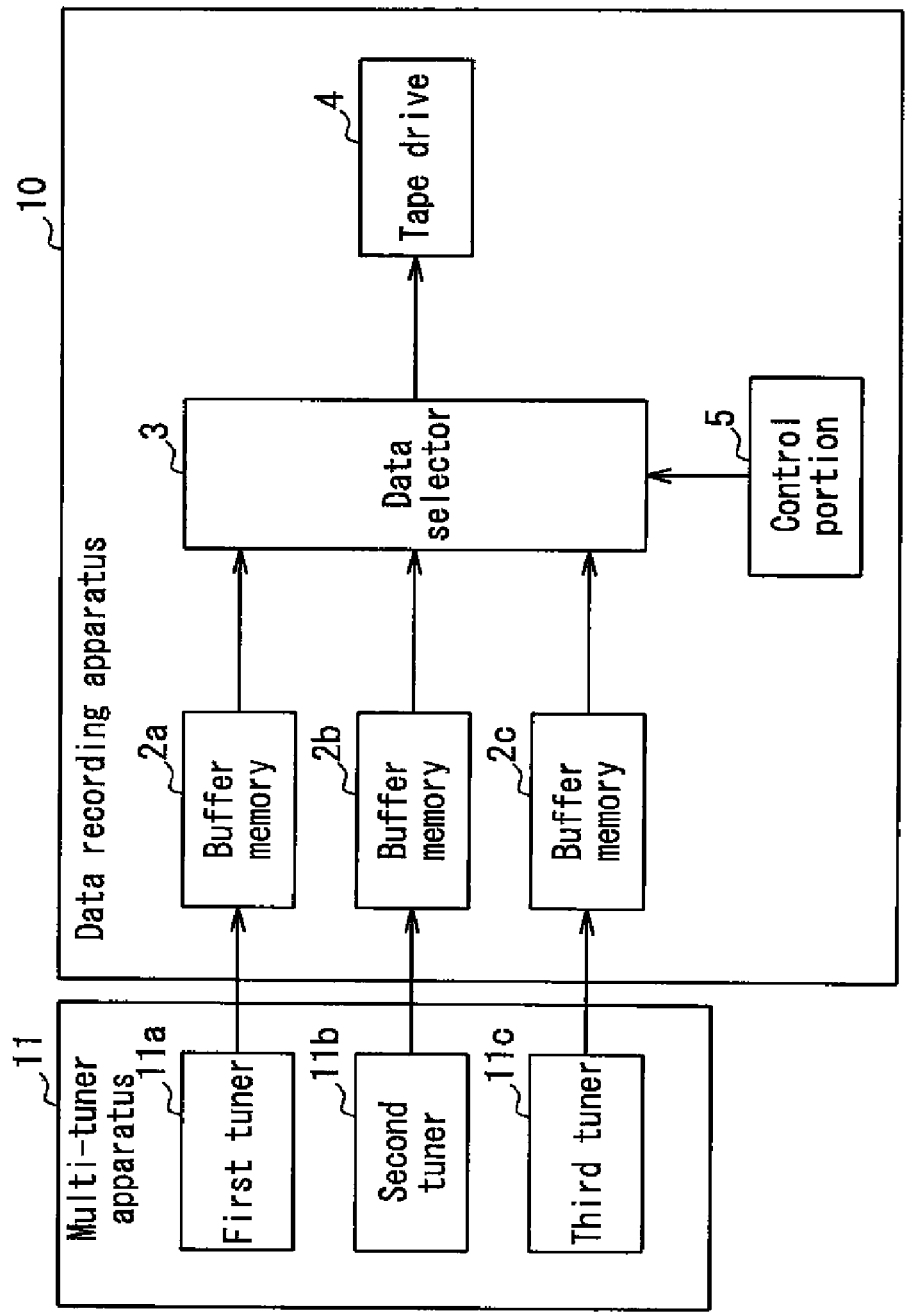
FIG. 5 is a block diagram showing a configuration of a multi-tuner system that is an example of the data recording apparatus or the data recording system of the embodiment.

FIG. 5 is a block diagram showing a configuration of a multi-tuner system that is an example of the data recording system. In FIG. 5, the same components as those in FIG. 1 are denoted with the same reference numerals as those therein, and the detailed description thereof will be omitted. A multi-tuner apparatus 11 includes a plurality of tuners 11a to 11c having different receiving frequencies. In the present configuration, although three tuners 11a to 11c are provided, at least four tuners may be provided. The tuners 11a to 11c receive airwaves with previously set frequencies, demodulate them to video voice signals, and convert them into data. In the multi-tuner apparatus 11, image compression processing or voice compression processing may be performed as appropriate. The data output from the tuners 11a to 11c is accumulated in the buffer memories 2a to 2c. The subsequent operation is the same as that of the above-mentioned security camera system, so that the description thereof will be omitted.

Accordingly, by applying the data recording system of the present embodiment to a multi-tuner system, broadcasting programs in a plurality of channels received by the plurality of tuners 11a to 11c can be recorded onto a magnetic tape in the tape drive 4.

The present invention is useful for an appliance recording data in a plurality of channels onto a magnetic tape.

What is claimed is:

1. A data recording apparatus, comprising:
an accumulating portion that accumulates moving image data, in which address data is added to main data in a plurality of channels, transferred from 17 or more external appliances on a channel basis;
a selecting portion that reads the moving image data accumulated in the accumulating portion; and
a recording portion that records the moving image data read by the selecting portion onto a magnetic tape,
wherein a plurality of the accumulating portions are provided independently for each of the external appliances,
the selecting portion selectively reads the moving image data accumulated in the plurality of the accumulating portions, and outputs the moving image data in order of recording onto the magnetic tape in the recording portion, and
the recording portion records the moving image data onto the magnetic tape at a data transfer speed of 20 mega bits per second or more using a head with 8 channels or more so that a plurality of data tracks are formed simultaneously.

2. The data recording apparatus according to claim 1, wherein the recording portion records the moving image data in real time onto the magnetic tape.

3. A data recording system, comprising:
17 or more external appliances capable of outputting main data; and
a data recording apparatus capable of obtaining the main data output from the external appliances,
wherein the data recording apparatus includes:
an accumulating portion that accumulates moving image data, in which address data is added to the main data in a plurality of channels, transferred from the external appliances on a channel basis;
a selecting portion that reads the moving image data accumulated in the accumulating portion; and
a recording portion that records the moving image data read by the selecting portion onto a magnetic tape,
wherein a plurality of the accumulating portions are provided independently for each of the external appliances,
the selecting portion selectively reads the moving image data accumulated in the plurality of the accumulating portions, and outputs the moving image data in order of recording onto the magnetic tape in the recording portion, and
the recording portion records the moving image data onto the magnetic tape at a data transfer speed of 20 mega bits per second or more using a head with 8 channels or more so that a plurality of data tracks are formed simultaneously.

4. The data recording system according to claim 3, wherein the recording portion records the moving image data in real time onto the magnetic tape.

* * * * *